United States Patent
Streitenberger et al.

(10) Patent No.: US 6,795,075 B1
(45) Date of Patent: Sep. 21, 2004

(54) GRAPHIC PROCESSOR HAVING MULTIPLE GEOMETRIC OPERATION UNITS AND METHOD OF PROCESSING DATA THEREBY

(75) Inventors: Robert Streitenberger, Hyogo (JP); Hiroyuki Kawai, Hyogo (JP); Junko Kobara, Hyogo (JP); Yoshitsugu Inoue, Hyogo (JP); Keijiro Yoshimatsu, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 259 days.

(21) Appl. No.: 09/685,895

(22) Filed: Oct. 11, 2000

(30) Foreign Application Priority Data

Nov. 5, 1999 (JP) ............................................ 11-315524

(51) Int. Cl.[7] .............................................. G06F 15/16
(52) U.S. Cl. ...................... 345/502; 345/504; 345/535; 345/544
(58) Field of Search ................................ 345/501–506, 345/519–520, 522, 530–574

(56) References Cited

U.S. PATENT DOCUMENTS

| | | |
|---|---|---|
| 5,010,515 A | 4/1991 | Torborg, Jr. |
| 6,012,120 A * | 1/2000 | Duncan et al. ............. 710/129 |
| 6,167,476 A * | 12/2000 | Olarig et al. ............... 710/128 |
| 6,348,919 B1 * | 2/2002 | Murphy ...................... 345/421 |

FOREIGN PATENT DOCUMENTS

| | | |
|---|---|---|
| JP | 8-335273 | 12/1996 |
| JP | 9-212654 | 8/1997 |

OTHER PUBLICATIONS

"Accelerated Graphics Port Interface Specification", revision 2.0, Intel Corporation (May 4, 1998).

\* cited by examiner

*Primary Examiner*—Kee M. Tung
(74) *Attorney, Agent, or Firm*—McDermott Will & Emery LLP

(57) ABSTRACT

A graphic processor includes first and second buses and a plurality of geometric operation units having an output connected to the second bus, and a circuit to allocate a plurality of ordered data blocks formed of data to be operated upon to the plurality of geometric operation units, and an input of at least one of the plurality of geometric operation units is connected to the first bus. The plurality of geometric operation units include all arbitrating circuit to arbitrate the order of output between an output buffer to store a result of processing by the allocated data blocks and another geometric operation unit, and output data resulting from processing onto the second bus in an order corresponding to the sequence of the plurality of data blocks of data to be operated upon.

28 Claims, 13 Drawing Sheets

FIG. 4

| Primary Bus Side | GE Core | Secondary Bus Side |
|---|---|---|
| Device driver prepares Display List in main memory and triggers DMA | | |
| GE DMA controller transfers DMA block from main memory to IFIFO | | |
| GE DMA controller transfers DMA block from main memory to IFIFO | "DMA_START" opcode is decoded. RC DMA sequence is generated and dispatched | |
| GE DMA controller transfers DMA block from main memory to IFIFO | Vertices V1 to V9 are processed and dispatched | RC DMA sequence is triggered |
| GE DMA controller transfers DMA block from main memory to IFIFO | "DMA_END" opcode is decoded. Termination sequence for RCA DMA is generated and dispatched | Vertices V1 to V9 are output |
| Semaphore is written to main memory | Secondary I/O supplies Dummy Data until outstanding SBA requests are flushed or invalidates all SBA requests | Termination sequence for RC DMA is executed |
| Device driver polls AGP DMA semaphore and (since set) polls Micro semaphore | | Dummy Data related to outstanding SBA request |
| Micro semaphore is set to indicate to device driver that RC DMA is in ready state | | |
| New DMA | | |

*FIG.17*

| TYPE | VALUE | TYPE | VALUE |
|---|---|---|---|
| WORD NUMBER | WC=16 | ADDRESS | IFIFO |
| COMMAND | DMA_START | WORD NUMBER | WC=21 |
| COMMAND | VERTEX | COMMAND | VERTEX(resent) |
| DATA | x(V1) | DATA | x(V6) |
| 〃 | y(V1) | 〃 | y(V6) |
| 〃 | z(V1) | 〃 | z(V6) |
| 〃 | w(V1) | 〃 | w(V6) |
| COMMAND | VERTEX | COMMAND | VERTEX |
| DATA | x(V2) | DATA | x(V7) |
| 〃 | y(V2) | 〃 | y(V7) |
| 〃 | z(V2) | 〃 | z(V7) |
| 〃 | w(V2) | 〃 | w(V7) |
| COMMAND | VERTEX(toggle bit set) | COMMAND | VERTEX |
| DATA | x(V3) | DATA | x(V8) |
| 〃 | y(V3) | 〃 | y(V8) |
| 〃 | z(V3) | 〃 | z(V8) |
| 〃 | w(V3) | 〃 | w(V8) |
| ADDRESS | IFIFO | COMMAND | VERTEX(toggle bit set) |
| WORD NUMBER | WC=20 | DATA | x(V9) |
| COMMAND | VERTEX(resent) | 〃 | y(V9) |
| DATA | x(V3) | 〃 | z(V9) |
| 〃 | y(V3) | 〃 | w(V9) |
| 〃 | z(V3) | COMMAND | DMA_END |
| 〃 | w(V4) | EOT | 00_00_00_01h |
| COMMAND | VERTEX | Dummy | xx_xx_xx_xx |
| DATA | x(V4) | Dummy | xx_xx_xx_xx |
| 〃 | y(V4) | ... | ... |
| 〃 | z(V4) | | |
| 〃 | w(V4) | | |
| COMMAND | VERTEX | | |
| DATA | x(V5) | | |
| 〃 | y(V5) | | |
| 〃 | z(V5) | | |
| 〃 | w(V5) | | |
| COMMAND | VERTEX(toggle bit set) | | |
| DATA | x(V6) | | |
| 〃 | y(V6) | | |
| 〃 | z(V6) | | |
| 〃 | w(V6) | | |

FIG. 18

| Primary Bus Side | Master GE Core | Slave GE Core | Secondary Bus Side |
|---|---|---|---|
| Device driver prepares Display List in main memory and triggers DMA in master GE | | | |
| DMA controller in master GE transfers DMA block from main memory to master IFIFO | | | |
| | "DMA_START" opcode is decoded RC DMA sequence is generated and dispatched | | |
| DMA controller in master GE transfers DMA block from main memory to slave IFIFO | Vertices V1 to V3 are processed and dispatched | | RC DMA sequence is triggered |
| DMA controller in master GE transfers DMA block from main memory to master IFIFO | | Vertices V3-V6 are processed and dispatched | Vertices V1 to V3 are output  AGP bursts are filled with Dummy Data indicating continuity to RC DMA |
| Semaphore is written to main memory | Vertices V6 to V9 are processed and dispatched | | Vertices (V3)V4'/V4"-V6 are output  AGP bursts are filled with Dummy Data indicating continuity to RC DMA |
| Device driver polls AGO DMA semaphore and (since set) polls micro semaphore | "DMA_END" opcode is decoded Termination sequence for RD DMA is generated and dispatched | | Vertices (V6)V8-V9 are output (V7 is discarded)  AGP bursts are filled with Dummy Data indicating continuity to RC DMA |
| | Secondary I/O supplies Dummy Data until outstanding SBA requests are flushed or invalidates all SBA requests | | Termination sequence for RC DMA is executed |
| | | | Dummy Data related to outstanding SBA |
| Micro semaphore is set to indicate to device driver that RC DMA is in ready state | | | |
| New DMA | | | |

| TYPE | VALUE |
|---|---|
| WORD NUMBER | WC=4 |
| DATA | x(V1) |
| 〃 | y(V1) |
| 〃 | z(V1) |
| COMMAND | DoIt(V1) |
| ADDRESS | Vertex Register 2 |
| WORD NUMBER | WC=4 |
| DATA | x(V2) |
| 〃 | y(V2) |
| 〃 | z(V2) |
| COMMAND | DoIt(V2) |
| ADDRESS | Vertex Register 3 |
| WORD NUMBER | WC=4 |
| DATA | x(V3) |
| 〃 | y(V3) |
| 〃 | z(V3) |
| COMMAND | DoIt(V3) |
| EOT | CONTINUE OR END |

GRAPHIC PROCESSOR HAVING MULTIPLE GEOMETRIC OPERATION UNITS AND METHOD OF PROCESSING DATA THEREBY

BACKGROUND OF THE INVENTION

1. Field of the Invention

The present invention relates to graphic processors, and more particularly, to a graphic processor including a primary bus such as a PCI (Peripheral Component Interface) bus and a secondary bus, a geometry engine (geometric operation unit) connected to these buses to execute geometric operations, and a device connected to the secondary bus such as a rendering controller (hereinafter referred to as an "RC") to generate images for display based on the result of geometric operation.

2. Description of the Background Art

In recent years, so-called 3D processing has been used in a very wide range of applications, according to which the three-dimensional geometric configuration of an object is calculated using a graphic processor, lighting processing is further executed to the surface of the configuration of the object thus obtained, and texture is attached for display. Generally used, conventional general-purpose CPUs (Central Processing Units) do not have enough ability to execute these processings, which forms a bottleneck in processing. These graphic processors therefore typically include a geometry engine specifically used for complex transformations, lighting calculation and clipping calculation often used in 3D graphic processing.

Referring to FIG. 1, a conventional graphic processor 240 includes a CPU 52 to execute a main routine in graphic processing and other control programs, a main memory 56 to store various programs to be executed by CPU 52 and data, a core logic 252 to execute input/output of data to/from main memory 56 under the control of CPU 52, a primary PCI bus 58 to which core logic 252 is connected, a geometry engine 254, which is, one of agents connected to primary PCI bus 58, a secondary bus 64 connected to the output side of geometry engine 254, and a rendering controller 66 connected to secondary bus 64 to execute rendering processing to graphic object data resulting from the calculation of geometry engine 254.

Graphic processor 240 executes various processings as described above, and the clipping processing will be briefly described as one example of the processings. The clipping processing is executed to separate a part of a graphic object without the range of display (clipping plane) from graphic operation. For example, now assume that there is a line formed of vertices V1 to V9 as shown in FIG. 2. Among these vertices, vertex V4 is outside the clipping plane. Vertex V4 is therefore clipped, and the intersecting points of segments V3V4 and V4V5 and the right side of the clipping place are to be processed as new vertices V4' and V4", respectively. Further in FIG. 2, if vertices V6 and V7 overlap, one of these vertices, V7, for example, is discarded, and only vertex V6 is to be processed. Herein, this will be called "reduction". A graphic corresponding to data pieces obtained as a result of the clipping and reduction processings is shown in FIG. 3.

These data pieces are prepared on main memory 56 by a device driver for geometry engine 254 operating on CPU 52, and transferred to geometry engine 254 from main memory 56 by DMA (Direct Memory Access) transfer. A DMA sequence at this time is given in FIG. 5 by way of illustration. As shown in FIG. 5, when DMA is triggered (260), data for the entire line is transferred to geometry engine 254 (262), the DMA is reset upon the end of the transfer (264) and then the next processing is executed.

FIG. 4 gives an example of activities observed on primary PCI bus 58, in geometry engine 254 and on secondary engine 64, respectively, at this time.

Graphic processors including such a geometry engine may be sometimes more targeted for extremely high ability of geometric operation rather than being less costly and sometimes more targeted for less costly construction rather than the ability, depending on their applications. In other words, there is a tradeoff between the cost and performance. Hence, a graphic processor of this kind having flexibility to address such a trade off is preferred.

SUMMARY OF THE INVENTION

It is therefore one object of the present invention to provide a scalable graphic processor capable of arbitrarily adjusting its operation performance depending upon applications and a data processing method in such a graphic processor.

Another object of the present invention is to provide a scalable graphic processor having a plurality of geometry engines and capable of adjusting its graphic operation performance based on the number of geometry engines, and a data processing method in such a graphic processor.

Yet another object of the present invention is to provide a scalable graphic processor having a plurality of geometry engines and capable of adjusting its graphic operation performance by allocating graphic operation to the geometry engines, and a data processing method in such a graphic processor.

An additional object of the present invention is to provide a scalable graphic processor having a plurality of geometry engines and capable of adjusting its graphic operation performance by allocating graphic operations to the geometry engines and of correctly combining outputs from the geometry engines, and a data processing method in such a graphic processor.

A graphic processor according to the present invention includes first and second buses and a plurality of geometric operation units having an output connected to the second bus. An input of at least one of the plurality of geometric operation units is connected to the first bus. The graphic processor further includes a circuit to allocate a plurality of ordered data blocks formed of data to be operated to the plurality of geometric operation units, and the plurality of geometric operation units each include an output buffer to store a result of processing by the allocated data blocks, and an arbitration circuit to arbitrate the order of output to the second bus with other geometric operation units and to output data resulting from processing onto the second bus in an order corresponding to an order of the plurality of ordered data blocks of the data to be operated.

Since graphic operation processings can be executed in parallel using the plurality of geometric operation units, the operation performance is improved, and the performance of the processor can be scalably adjusted based on the number of geometric operation units. Outputs from the plurality of geometric operation units are provided in a correct order using the arbitration circuit.

Preferably, the graphic processor further includes a main memory device connected to the first bus, the circuit for allocation includes a direct memory access circuit provided in a geometric operation unit having an input connected to the first bus to transfer a data block provided on the first bus from the main memory to the plurality of geometric operation units based on a destination address included in the provided data block.

By inserting a destination address in a data block, desired data may be transferred to a target geometric operation unit by DMA transfer. Data may be allocated to a plurality of geometric operation units without having to use special hardware specific for allocating the data.

More preferably, the plurality of data blocks each has a toggle bit indicating the end of valid information in the data block.

By setting a toggle bit at the end of a data block, a geometric operation unit may be aware of the end of a data block to be processed by itself and take an appropriate operation.

More preferably, the plurality of geometric operation units each output a result of operation to the output buffer each time a toggle bit set in a data block is encountered and sets a toggle bit indicating the end of data at the end of the data in the output buffer.

By setting a toggle bit at the end of data in the output buffer, output may be temporarily withheld at the time of outputting the data in the output buffer, and the data output order may be adjusted by appropriate arbitration.

More preferably, the arbitration circuit surrenders the access right of the second bus to another geometric operation unit each time a toggle bit in data in the output buffer is encountered.

Since the access right of the second bus is transferred from one geometric operation unit to another geometric operation unit each time a toggle bit in an output buffer is encountered, the access authority may be transferred for each boundary between data blocks and outputs may be provided in an order corresponding to the original order of input data blocks.

According to another aspect of the present invention, a data processing method in a graphic processor includes the steps of dividing data to be operated upon into a plurality of data blocks, allocating the plurality of data blocks to a plurality of geometric operation units through a first bus, processing the allocated data blocks in the plurality of geometric operation units, and arbitrating the order of output among the plurality of geometric operation units thereby outputting data resulting from processing onto a second bus in an order corresponding to the sequence of the plurality of data blocks in the data to be operated.

Since graphic operation processings may be executed in parallel using the plurality of geometric operation units, the operation performance is improved and the performance of the processor can be scalably adjusted based on the number of geometric operation units. A result of processing based on divided processings by the plurality of geometric operation units is obtained on the second bus in a correct order.

According to yet another aspect of the present invention, a geometry engine includes: a geometry operation unit for performing geometric operations; an allocation circuit receiving a plurality of data blocks through a first bus sequentially, for allocating the plurality of data blocks to said geometry operation unit and another operation device, said geometry operation unit processing a data block allocated by said allocation circuit to output a result of processing corresponding to the allocated data block; an output buffer for storing the result of processing; and an arbitration circuit for arbitrating the order of output to a second bus with said another operation device and for outputting the result of processing stored in said output buffer to the second bus in an order corresponding to the sequence of the plurality of data blocks.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a table of examples of activities on the sides of a primary bus, in a graphic engine core and on a secondary bus in a conventional graphic processor, respectively, in comparison;

FIG. 17 is a table showing an example of data for DMA prepared in a main memory in an apparatus according to one embodiment of the present invention;

FIG. 18 is a schematic diagram showing the relation between activities observed on a primary bus, in a master geometry engine, in a slave geometry engine and on a secondary bus, respectively, in an apparatus according to one embodiment the present invention;

DESCRIPTION OF THE PREFERRED EMBODIMENTS

Figure 6:
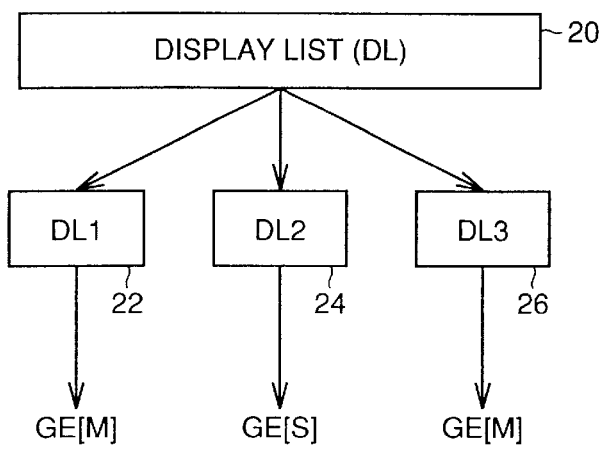
FIG. 6 is a diagram for use in illustration of the processing of dividing a display list transmitted from the primary bus side according to the present invention.

Referring to FIG. 6, in a graphic processor according to one embodiment of the present invention, a large display list (DL) 20 provided from a CPU to a geometry engine is divided into a number of display lists (such as first to third display lists 22 to 26) by a device driver for a graphic board including the following graphic processor which operates under the control of the CPU. The graphic processor includes a single master geometry engine (referred to as GE[M]), and one or more (e.g. one) slave geometry engines (referred to as GE[S]), and the above-described sub display lists are sequentially transferred to these geometry engines, and processed sequentially and as in parallel as possible by each of the geometry engines.

Figure 7:
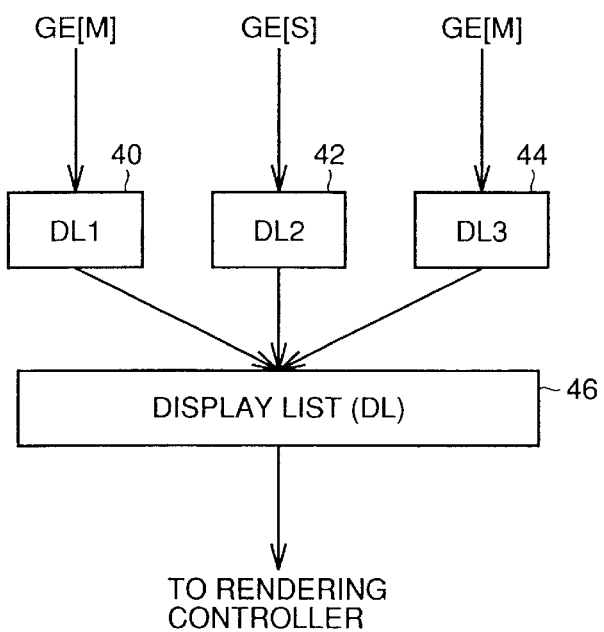
FIG. 7 is a diagram for use in illustration of the processing of reconstructing a display list output to a secondary bus from a graphic engine according to the present invention.

Referring to FIG. 7, first to third display lists 40 to 44 resulting from operations by the geometry engines are gathered into a single display list 46 while maintaining the order in the original display list 20, and transferred to rendering controller 66. The order of the display lists at this time is maintained correctly by an arbiter in each of the geometry engines as will be described hereinafter.

Figure 8:
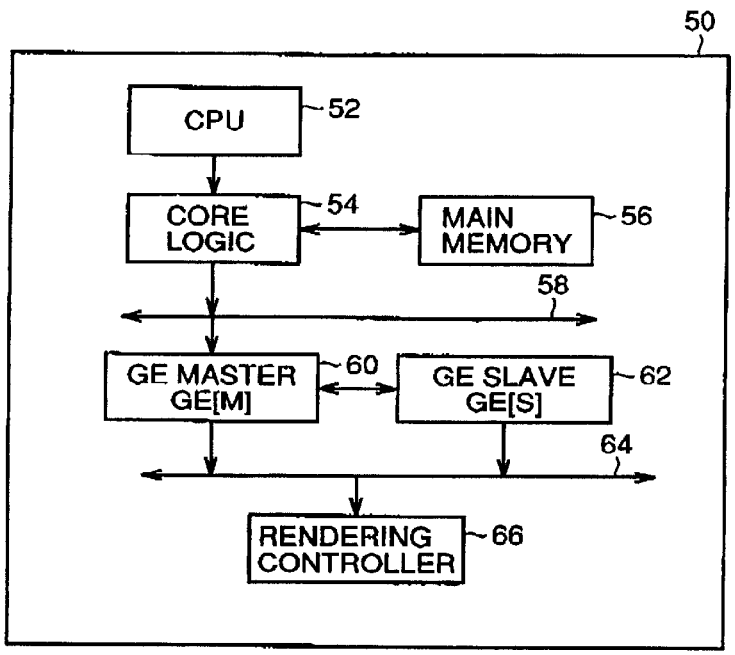
FIG. 8 is a block diagram of a graphic processor according to one embodiment of the present invention.

Referring to FIG. 8, graphic processor 50 according to one embodiment of the present invention includes a CPU 52, a core logic 54, a main memory 56, a primary PCI bus 58 to which core logic 54 is connected, a master geometry engine 60 (GE[M]) connected to primary PCI bus 58, a slave geometry engine 62 (GE[S]) connected to master geometry engine 60, a secondary bus 64 to which master geometry engine 60 and slave geometry engine 62 are connected, and a rendering controller 66 connected to secondary bus 64. As will be described, master geometry engine 60 and slave geometry engine 62 have the same configuration, and one of them is set as a master engine and the other as a slave engine based on a setting signal applied when the graphic operation processor is reset. In the processor according to this embodiment, a geometry engine serves as a master when the value of the setting signal is binary "0", and the engine serves as a slave when the value of the setting signal is binary "1". As will be described, master geometry engine 60 allocates data provided from main memory 56 by DMA transfer between itself and a slave geometry engine connected to itself. The processing is executed using microcodes controlling the operation of master geometry engine 60.

Figure 9:
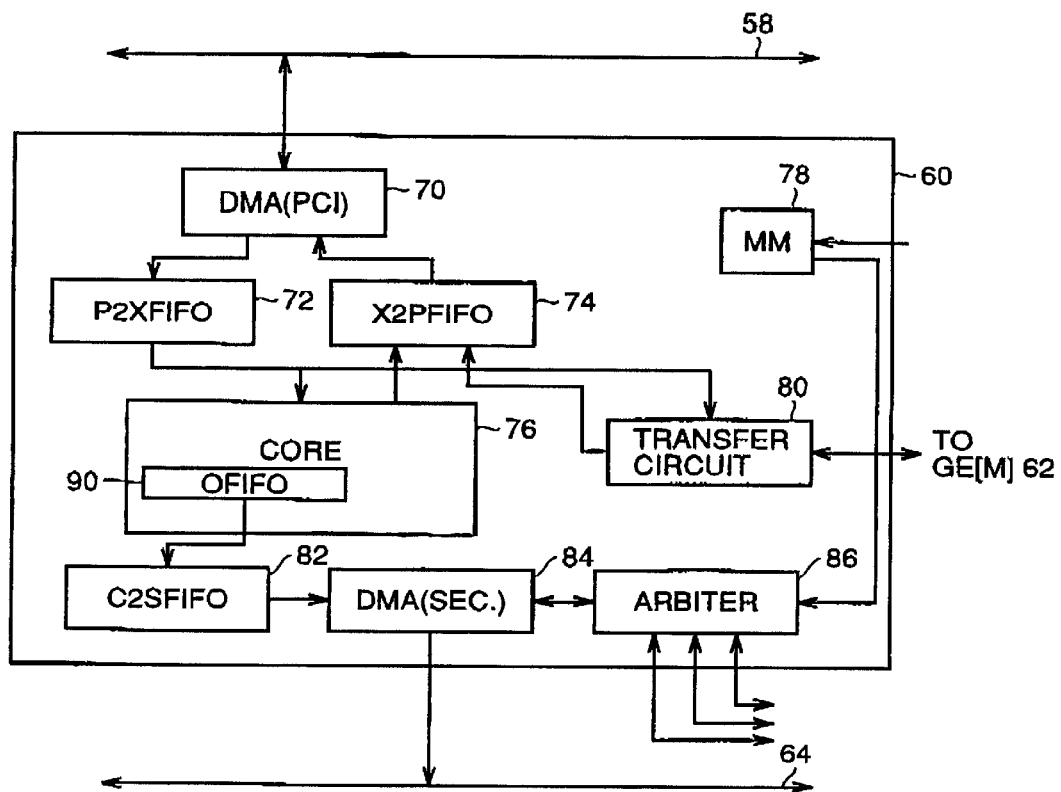
FIG. 9 is a block diagram of a geometry engine used in a graphic processor according to one embodiment of the present invention.

Referring to FIG. 9, master geometry engine 60 for example includes a DMA controller 70 to execute direct data transfer between main memory 56 and a device corresponding to an address specified in the memory map, a P2X FIFO (first-in-first-out) 72 to temporarily store data transferred to some storage device (X) from a primary bus (P), an X2P FIFO 74 to conversely temporarily store data transferred from some storage device (X) to primary bus (P), a geometry core 76 for geometric operations including an integer operation unit, floating point units and the like, a transfer circuit 80 to transfer data to and from other geometry engines, a C2S FIFO 82 to temporarily store data output from geometry core 76 (C) to a secondary bus (S), a DMA controller 84 to directly control memory access on secondary bus (S), and an arbiter 86 to arbitrate the order of output data to secondary bus 64 with the other geometry engines as will be described.

As described above, slave geometry engine 62 also has the same configuration as that of master geometry engine 60. Note however that slave geometry engine 62 is not connected to primary PCI bus 58 and therefore cannot directly receive data from main memory 56. Slave geometry engine 62 receives data allocated to slave geometry engine 62 by DMA controller 70 in master geometry engine 60 through transfer circuit 80 and a similar transfer circuit which is not shown in slave geometry engine 62 as will be described.

Figure 10:
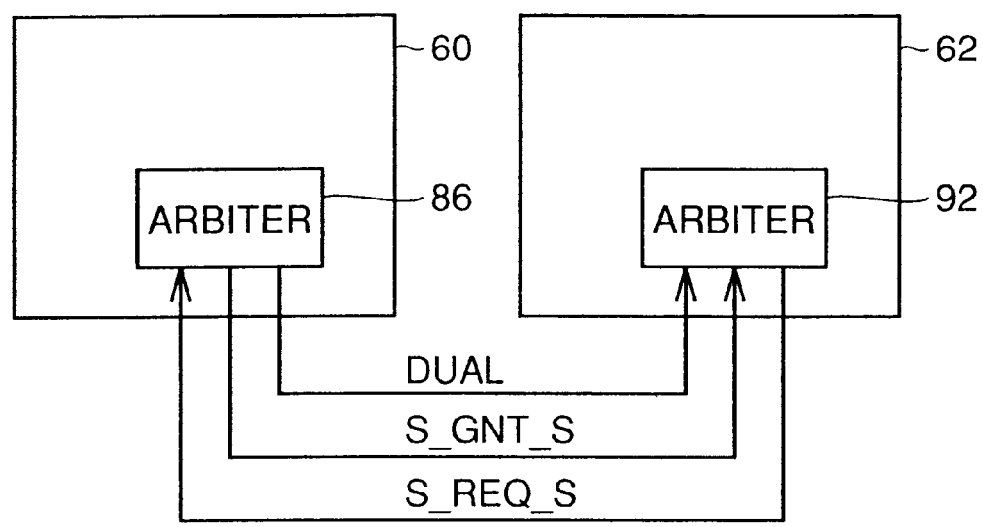
FIG. 10 is a diagram for use in illustration of signals used for arbitration between a master geometry engine and a slave geometry engine.

Referring to FIG. 10, arbiter 86 in master geometry engine 60 and arbiter 92 in slave geometry engine 62 arbitrate output to secondary bus 64 using a signal S_GNT_S, which is used to give permission to slave geometry engine 62 to output data, a signal S_REQ_S, which is output when slave geometry engine 62 has data to output and a signal Dual, which is used to indicate a burst boundary. Arbiters 86 and 92 are formed of a simple state machine. The state transition chart is given in FIG. 14.

Signal Dual is output when data must be temporarily transferred from CPU 52 to rendering controller 66 in the middle of a burst, and at this time, master geometry engine 60 temporarily has the access right. The access right is returned to the original owner of the access right after necessary data transfer is over. This is a mechanism provided for preventing delay in display update when the display must be immediately updated in response to an operation by the operator such as a change in the position of the mouse pointer in the display of the computer. The function is however not related to the present invention and will not be described herein in detail.

Figure 14:
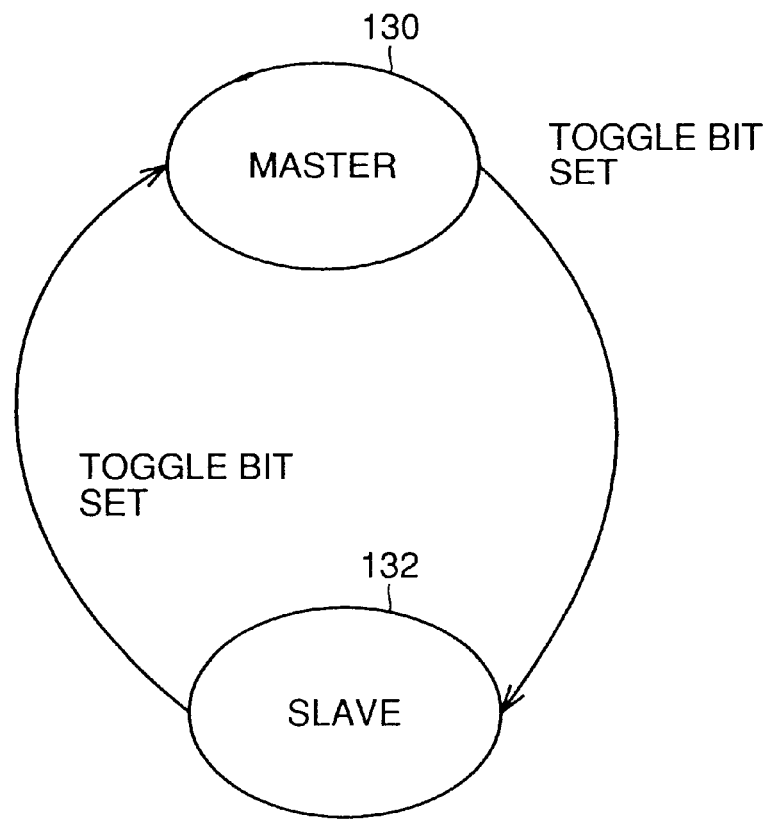
FIG. 14 is a diagram of the state transition of an arbiter.

As shown in FIG. 14, arbiter 86 is for example a state machine which surrenders the access right of secondary bus 64 to the other if a toggle bit, which will be described later, in a data block is processing is set. More specifically, when master geometry engine 60 has the access right of secondary bus 64 (130), and a toggle bit in a block being processed by the engine is set, the access right of secondary bus 64 is transferred from master geometry engine 60 to slave geometry engine 62 (132). This similarly applies if salve geometry engine 62 has the access right. This simple mechanism allows data to be output in the correct order onto secondary bus 64 and display list 46 as shown in FIG. 7 is reconstructed.

Figure 11:
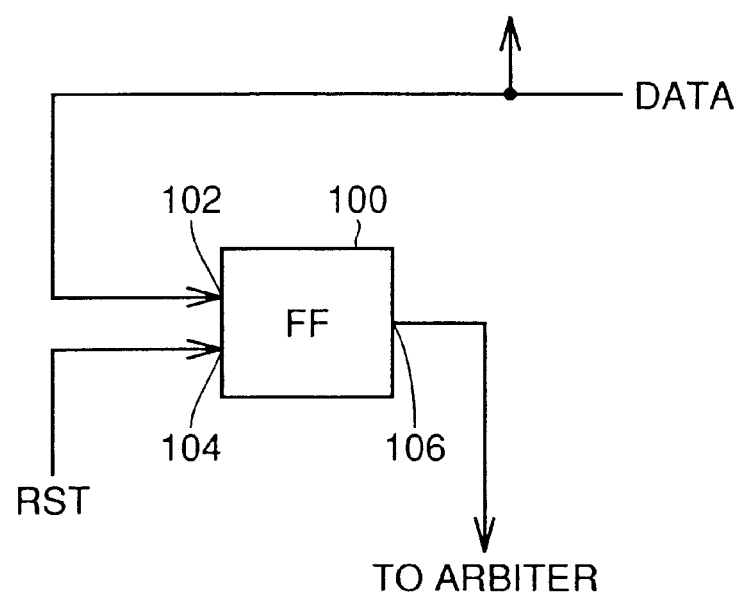
FIG. 11 is a diagram of the configuration of a flip-flop to set a geometry engine to a master or a slave.

FIG. 11 shows a flip-flop which holds data to set master geometry engine 60 and slave geometry engine 62 as master and slave engines, respectively when the graphic processor is reset. This flip-flop 100 is provided in memory mapping registers 78, and has a data terminal 102 connected with an external pin, a clock terminal provided with a reset signal RST, and an output terminal 106 connected to arbiter 86 or 92.

This flip-flop 100 holds data applied to data terminal 102 through an external pin when a reset signal transits from a low level to a high level, and thereafter outputs the data to an arbiter. Since reset signal RST is maintained at a high level during a normal operation of the graphic processor, data from data terminal 102 will not be held again by flip-flop 100, and the data terminal connected to data terminal 102 can be used for input/output of data to other elements in the circuit.

Figure 12:
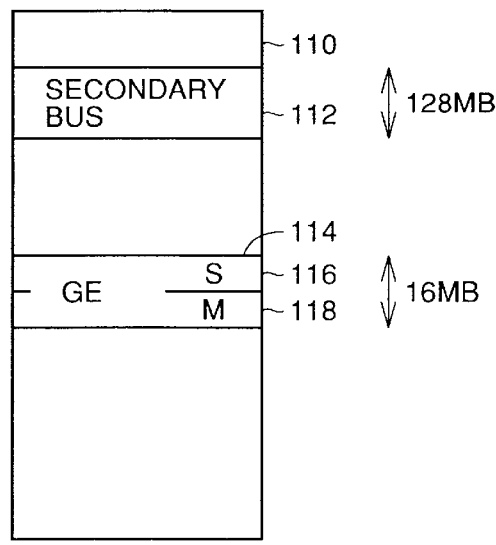
FIG. 12 is a schematic diagram of an example of memory mapping.

Referring to FIG. 12, graphic processor 50 controls accessing to each device by preallocating memory space 110 to each device. FIG. 12 shows a secondary address allocation region 112 and a geometry engine address allocation region 114. In this embodiment, geometry engine address allocation region 114 further includes a slave geometry engine address allocation region 116 having higher order addresses, and a master geometry engine allocation region 118 having lower order addresses. For example, in a DMA transfer processing, by specifying an address in these regions, data is transferred to the addressed device.

Figure 13:
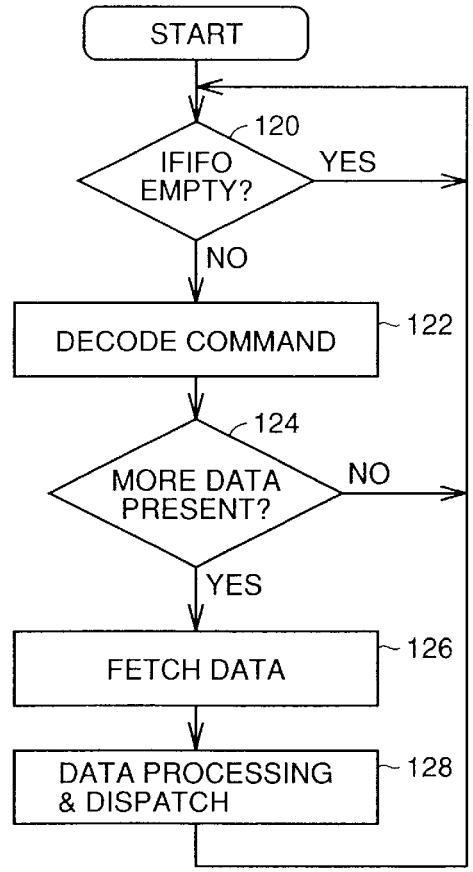
FIG. 13 is a flow chart for use in illustration of processing executed by a geometry engine according to one embodiment of the present invention.

Referring to FIG. 13, the control structure of processing executed in a geometry engine is as follows when a display list is transferred from the main memory by DMA transfer processing. First, it is determined whether or not data is present in an input first-in-first-out (IFIFO) (not shown) in the geometry engine in which data transferred by the DMA transfer processing is stored (120). If the IFIFO is empty, the control returns to step 120, and waits until data is transferred to the IFIFO.

If data is present in the IFIFO, the control proceeds to step 122, and a command taken out from the IFIFO is decoded. As a result of this decoding, it is determined whether or not data should be present in the IFIFO (124), and the control returns to step 120 if data is not present. If data is present in the IFIFO, the data is fetched (step 126) and then the data and command are dispatched to various processing units present in a geometry engine for data processing (such as an integer operation unit, a plurality of floating point units, and a dividing portion) (128). The control then returns to step 120 and waits for the next data to be transferred.

At this time, the control logic of OFIFO to which the data is dispatched determines whether or not a "toggle register" has been set or reset by a microcode. If the toggle register has been set, the control logic provides a signal indicating that the data in the memory bank is the final data of this data block to the arbiter. Thus, output of the data has been completed, and data on secondary bus 64 toggles to an output from another geometry engine.

Figure 15:
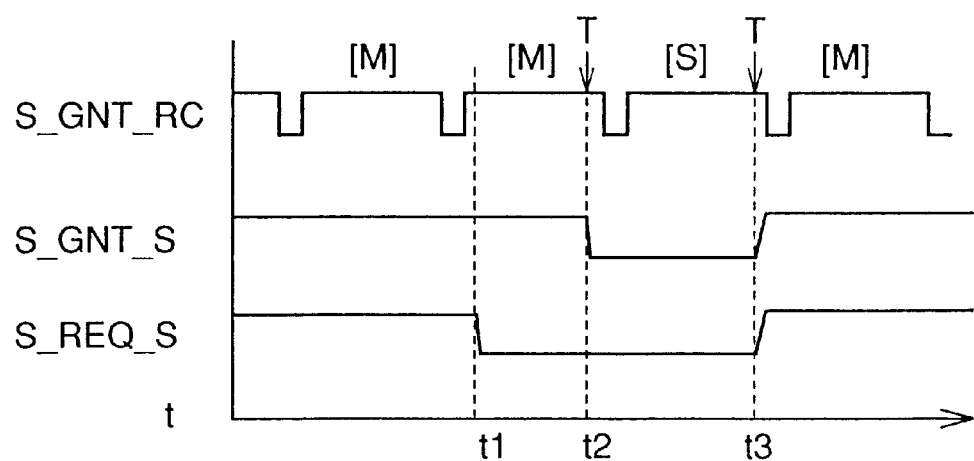
FIG. 15 is a timing chart showing changes in signals for arbitration.

Meanwhile, the relation between signals S_GNT_S and S_REQ_S for arbitrating exchanged between arbiters 86 and 92 and signal S_GNT_RC indicating the presence of data on secondary bus 64 to rendering controller 66 will be described in conjunction with FIG. 15. Rendering controller 66 determines the presence of data on secondary bus 64 when signal S_GNT_RC attains a low level and takes and processes the data on secondary bus 64. Rendering controller 66 is not aware at all of whether the data on secondary bus 64 is output from master geometry engine 60 or slave geometry engine 62. Data is assumed to be output in a correct arbitrated order onto secondary bus 64.

For this purpose, arbiters 86 and 92 perform arbitrating operation as follows. More specifically, assume that at first the master has the access right to secondary bus 64 as a default. When the slave is to output data to secondary bus 64, arbiter 92 pulls signal S_REQ_S to a low level (time t1). After signal S_REQ_S has attained a low level, arbiter 86 pulls a signal S_GNT_S to a low level at the point when a bit called "toggle bit" provided at a data block to be processed on the master side is set. When signal S_GNT_S attains a low level, the access right to secondary bus 64 is moved to the slave side (time t2).

Slave geometry engine 62 which has thus acquired the access right to secondary bus 64 outputs data it processed onto secondary bus 64 and pulls signal S_REQ_S to a high level if a toggle bit present at the end of the output data is set. At this point, there is no access request to secondary bus 64 from the slave side. Arbiter 86 returns signal S_GNT_S to a high level once signal S_REQ_S returns to a high level. Thus, the access right to secondary bus 64 is returned to the master.

The way data is output in a correct order onto secondary bus 64 by such a simple arbitration operation will be now described with reference to FIGS. 16 and on. An example of a display list on main memory 56 prepared by a device driver is shown in FIG. 7. The data shown in FIG. 17 is largely divided into three blocks. These blocks are processed by the master, slave and then master, respectively.

In FIG. 17, the value given in the right of the index "WORD NUMBER" at the head of each block represents the total number of data words to be transferred which are included in the block. If "WC=16", sixteen (16) words in the block are to be DMA-transferred. The word itself is not transferred.

In FIG. 17, what is written in the right of the index "Command" is a command used for DMA transfer and a command to be provided to each geometry engine. "DMA START" identifies the start of DMA, and after the word, the number of words represented by "WORD NUMBER" are to be transferred to a specified address. It should be noted here that while this also applies to FIG. 17, the first block is always transferred to the master geometry engine as a default in this embodiment, and the head block does not have a destination address identified. Meanwhile, the head of each of the second and the following blocks stores the address of IFIFO in the master or slave as a destination address. This address is specified by address mapping shown in FIG. 12.

The following words, whose number is represented by the "WORD NUMBER," is the content of the data to be transferred. For each of the blocks, data is sequentially transferred to the storage region of a device represented by the "address" at the head of the block. It should be noted here that DMA controller 70 in master geometry engine 60 executes this allocation. More specifically, DMA controller 70 reads the "address" of data transferred from main memory 56, and allocates data in the following blocks to a specified device (IFIFO in master geometry engine 60 or slave geometry engine 62) based on the content. This is the way the DMA controller generally functions.

Figures 19, 20:
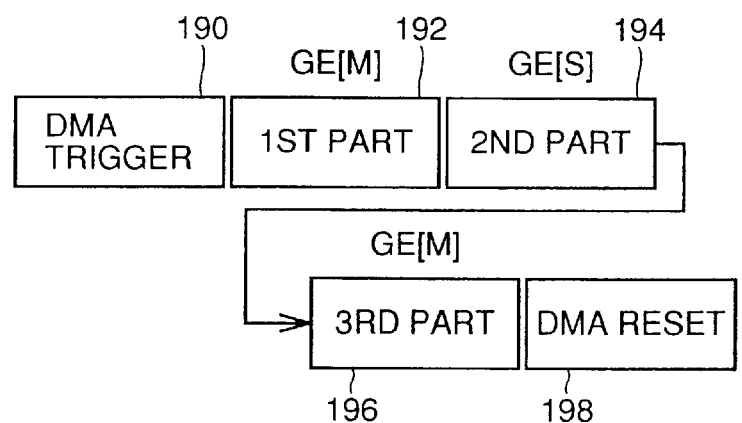
FIG. 19 is a table for use in illustration of data prepared in an output first-in-first-out (OFIFO) in a geometry engine according to one embodiment of the present invention.
FIG. 20 is a DMA transfer sequence diagram from a main memory to a geometry core in a graphic processor according to one embodiment of the present invention.

As shown in FIG. 20, in the transfer sequence from the start to the end of DMA transfer, DMA transfer is triggered first (190). Then, the first block 192 is transferred to the master, the second block to the slave and then the third block to the master, in other words, each block is transferred alternately to the master and slave geometry engines in this embodiment. When transfer of all the blocks is complete, the DMA transfer is reset (198).

It should also be noted in the content of the data shown in FIG. 17 that the final command word in each block is identified as "set toggle bit". More specifically, the device driver not only divide the entire data into small blocks in preparing the data shown in FIG. 17, but also sets the toggle bit of the last command word in each block, and resets the toggle bit of the command word in another block. Thus, as can be seen, by setting the toggle bit of the last part of data in each block, a geometry engine processing data in this block completes data processing to be executed by itself in response to the toggle bit being set, and then data to be processed by another geometry engine is to be input. Then, the use of signals S_GNT_S and S_REQ_S allows the access right to secondary bus 64 to be transferred for data output after data processing by another block when the data in the block processed by itself is complete. Thus, data is output in a correct order to secondary bus 64.

Figure 16:
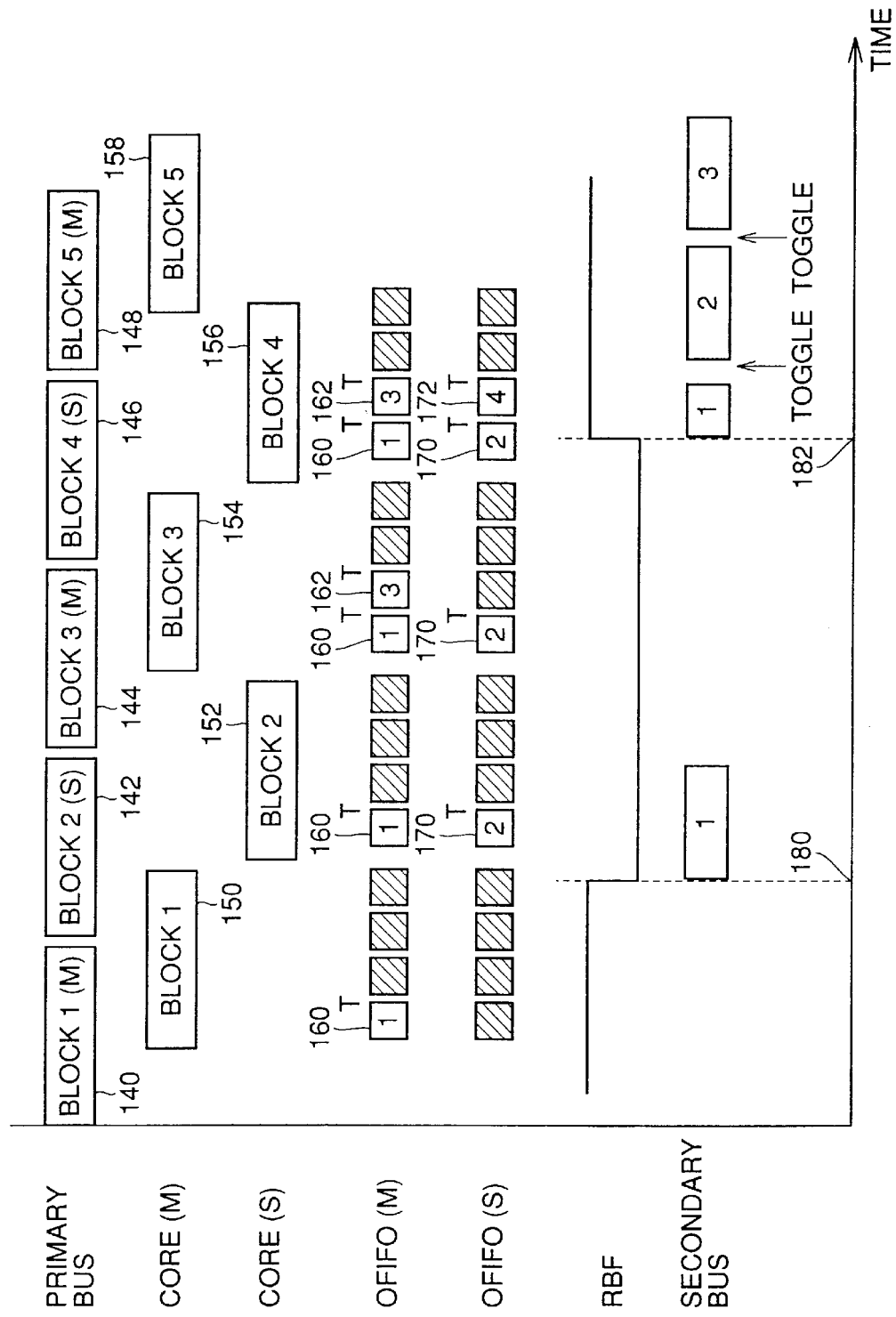
FIG. 16 is a chart showing an output sequence from a geometry core.

Referring to FIG. 16, master geometry engine 60 and slave geometry engine 62 operate as follows during the above period. For the purpose of simplicity, there are five blocks, blocks 140 to 148 as blocks to be processed in the following description. Among these blocks, blocks 140, 144 and 148 are to be processed by master geometry engine 60 while blocks 142 and 146 are to be processed by slave geometry engine 62. Note that activities on primary bus 58, operations in master geometry engine 60 and slave geometry engine 62, and activities on secondary bus 64, respectively, are given in comparison in a table in FIG. 18.

Master geometry engine 60 receives a block (block 150) which is transferred from block 140, and the processing to this block is executed by the geometry engine core of master geometry engine 60. Thereafter, blocks 142, 144, 146 and 148 are transferred to master geometry engine 60 or slave geometry engine 62 in the order of the slave, master, slave and master.

In the following description, each of the output FIFOs (OFIFOs) in master geometry engine 60 and slave geometry engine 62 includes 4 banks for the purpose of simplicity of the description.

First, at time 180, the processing of block 150 ends in master geometry engine 60, and the result is stored in the first bank 160 of the FIFO in master geometry engine 60. At this time, the toggle bit of the last command of the block is set, and at the end of the first block 160 in the OFIFO, a bit corresponding to the toggle bit is set. The other banks of the OFIFO in master geometry engine 60 and the OFIFO in slave geometry engine 62 are all empty (shadowed). Note that an example of the form of data stored in the OFIFO is given in FIG. 19.

Since the master has the access right of secondary bus 64 at first, the resulting data is output from the OFIFO in master geometry engine 60 to secondary bus 64 at the point when master geometry engine 60 finishes the processing of the first block, and rendering controller 66 starts processing the data. At the same time, a signal RBF indicating that rendering controller 66 is busy is pulled from a high level to a low level. In the example shown in FIG. 16, assume that after the head of the first block is output, it takes rendering controller until time 182 to process the data.

During this period, the succeeding blocks are transferred to master geometry engine 60 and slave geometry engine 62 for processing. As shown in the third row (OFIFO (M)) and the fourth row (OFIFO (S)) in FIG. 16, data is stored in the order of the first bank 160 in the master OFIFO, the first bank 170 in the slave OFIFO, the second bank 162 in the master OFIFO, and the second bank 172 in the slave OFIFO. It should be noted here that the last toggle bit of each bank is necessarily set.

Meanwhile, when signal RBF indicating that rendering controller 66 is busy is returned from the low level to the high level, the remaining data in block 160 is output onto secondary bus 64, and again processed by rendering controller 66. At this time, since the toggle bit is set at the end of block 160, arbiter 86 in master geometry engine 60 pulls signal S_GNT_S to a low level, and as a result, the access right of secondary bus 64 is transferred to slave geometry engine 62.

Thereafter, data resulting from processing of block 152 (142) is output onto secondary bus 64 from the first block 170 in the OFIFO in slave geometry engine 62, and processed by rendering controller 66. At the end of this block, since the toggle bit is set, arbiter 92 in slave geometry engine 62 pulls signal S_REQ_S to a high level, and as a result, the access right of secondary bus 64 is transferred to master geometry engine 60.

By repeating the same processing, data processed by master geometry engine 60 and slave geometry engine 62 appear on secondary bus 64 in the original order of the blocks, and is provided to rendering controller 66 in this order. Therefore, if a plurality of geometry engines are used, the processing of rendering controller 66 may be executed correctly.

Figure 1:
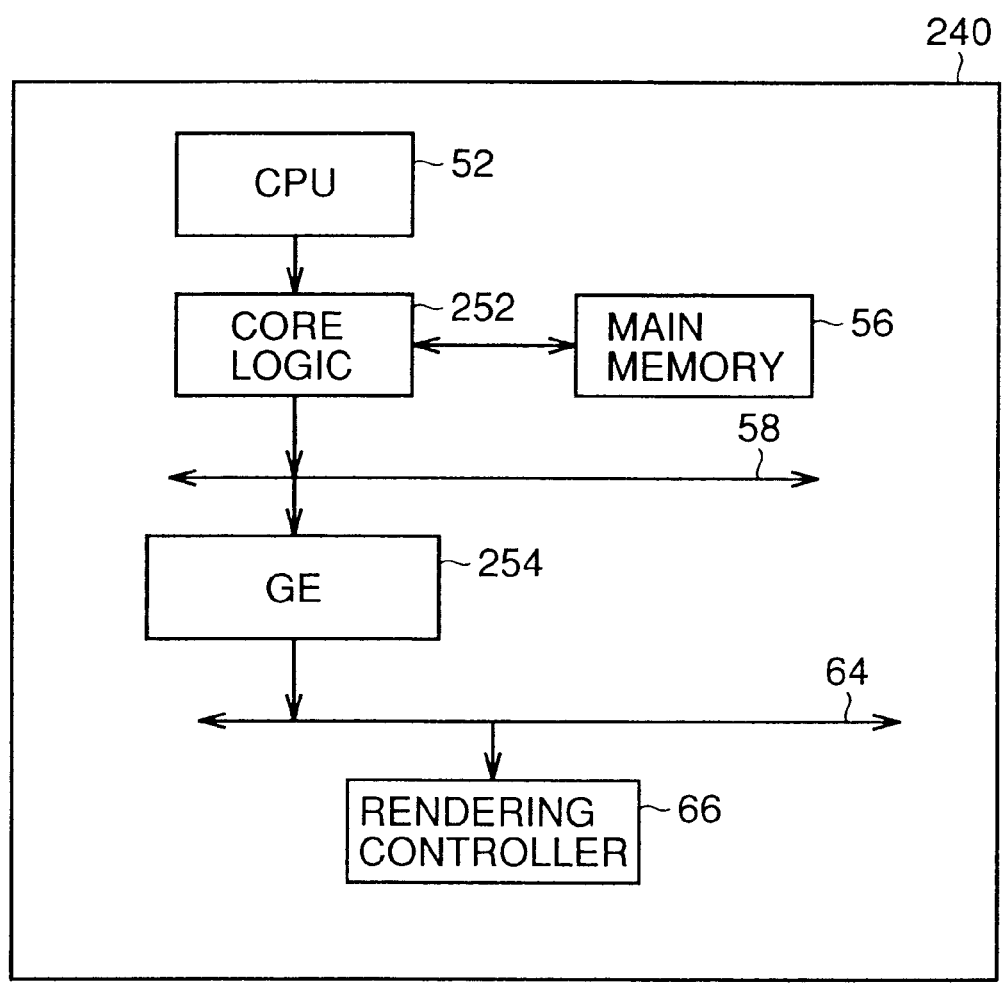
FIG. 1 is a block diagram of the configuration of a conventional graphic processor.
Figure 2:
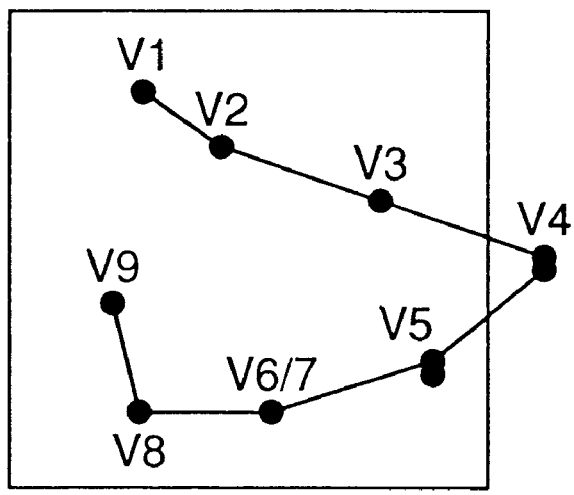
FIG. 2 is a diagram for use in illustration of clipping processing.
Figure 3:
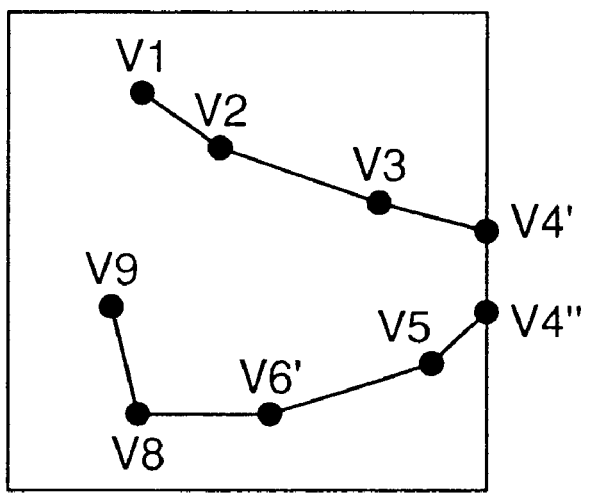
FIG. 3 is a diagram for use in illustration of clipping processing.
Figure 5:
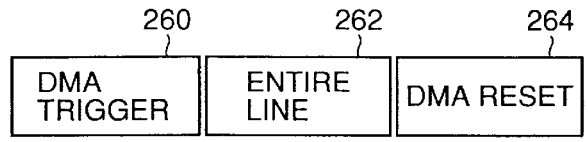
FIG. 5 is a DMA transfer processing sequence diagram from a main memory to a graphic engine in a conventional graphic processor.
Figure 21:
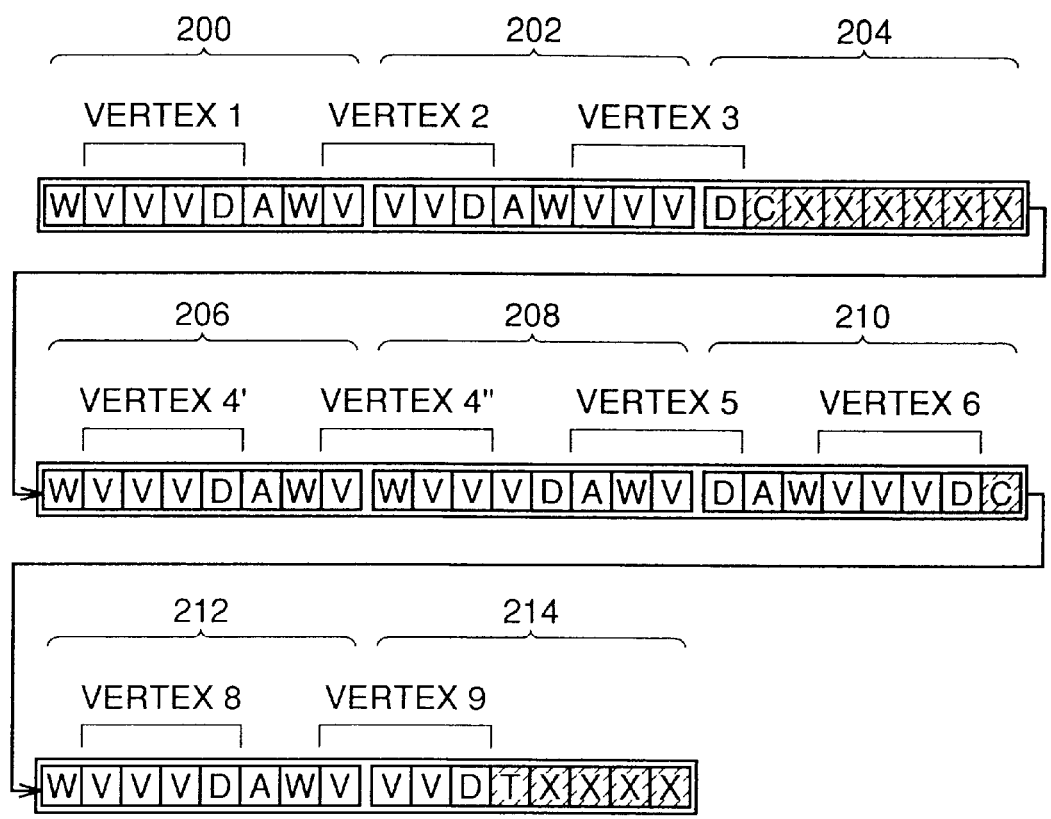
FIG. 21 is a sequence diagram of data output onto a secondary bus in a graphic processor according to one embodiment of the present invention.

FIG. 21 shows a sequence of data output to secondary bus 64. Herein, data transfer through secondary bus 64 from a geometry engine to rendering controller 66 is executed in 8-data word bursts, and data corresponding to the clipping processing in FIG. 3 is output. As shown in FIG. 21, data from vertices 1 to 3 is transferred in the first three bursts (200, 202, 204). These are all output from master geometry engine 60.

Then, vertices 4', 4" and 6' are output in the next three bursts 206, 208 and 210. These are all output from slave geometry engine 62.

Finally, vertices 8 and 9 are output in the next two bursts 212 and 214. Vertex 7 is not present in the output because of reduction.

Thus, data resulting from the processing is output in a correct order onto secondary bus 64 from a plurality of geometry engines, and rendering controller 66 can process these pieces of data just as they are processed by a single geometry engine.

As described above, in the graphic processor in this embodiment, a plurality of geometry engines are provided. A large display list is divided into a plurality of blocks by the device driver, and a prescribed toggle bit, i.e., information indicating the end of a processing unit is inserted at the end of each block. An address corresponding to a geometry engine to process the data is inserted in each block (or determined as a default), and each block is provided to a specified geometry engine for processing. At the end of the processing result, a toggle bit indicating the end of the block is set.

The master and the slave output processed data once they acquire the access right of secondary bus 64, and surrender the access right once a toggle bit in data which is set is encountered. Thus, the access right is transferred orderly between the master and the slave, so that data resulting from processing appears on the secondary bus in a correct order corresponding to the original order of the data blocks.

What has been conventionally executed by a single geometry engine is executed by a plurality of geometry engines. As a result, processings can be executed in parallel, and therefore graphic processing can be executed at a higher speed. If the number of slave geometry engines is increased, the parallel processing is further enhanced, and a higher performance graphic processor can be provided. Meanwhile, if more emphasis is put on the cost, the number of slave geometry engines may be two for example, so that graphic processing can be achieved faster with relatively small increase in the cost.

As in the foregoing, according to this embodiment, graphic operation processing can be executed in parallel using a plurality of geometric operation units, the operation performance improves and the performance of the processing can be scalably adjusted based on the number of geometric operation units. As a result, a scalable graphic processor whose graphic operation performance can be adjusted arbitrarily depending upon applications can be provided.

By inserting a destination address in a data block, desired data can be transferred to a target geometric operation unit by DMA transfer. Data can be allocated to a plurality of geometric operation units without having to use specific hardware for allocating the data. By setting a toggle bit at the end of a data block, the geometric operation processor can be aware of the end of the data block which the processor must process, and can take an appropriate operation. By setting a toggle bit at the end of data from an output buffer, output can be temporarily withheld and the order of outputting data can be adjusted by arbitration in appropriate timings when data is output from the output buffer. Each time a toggle bit in the output data buffer is encountered, the access right of the second bus is transferred from one geometric operation unit to another. Therefore, the access right can be transferred in an appropriate timing i.e., at the boundary of a processed data block, so that data can be output in the original order of input data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A graphic processor, comprising:

a first bus and a second bus;

a plurality of geometric operation units having an output connected to said second bus, an input of at least one of said plurality of geometric operation units being connected to said first bus; and a circuit configured for allocating a plurality of ordered data blocks formed of data to be operated upon to said plurality of geometric operation units, each of said plurality of geometric operation units comprising:

an output buffer for storing a result of processing of said allocated data blocks; and an arbitration circuit for arbitrating the order of output to said second bus with another said geometric operation unit and outputting data resulting from processing onto said second bus in an order corresponding to the sequence of said plurality of data blocks of data to be operated upon.

2. The graphic processor according to claim 1, further comprising a main memory device connected to said first bus, wherein said circuit for allocation comprises a direct memory access circuit provided in said geometric operation unit having an input connected to said first bus for transferring a data block provided from said main memory device through said first bus to said plurality of geometric operation units based on a destination address included in said provided data block.

3. The graphic processor according to claim 2, wherein said plurality of data blocks each have a toggle bit indicating the end of valid information in the data block.

4. The graphic processor according to claim 3, wherein said plurality of geometric operation units each output a result of operation and set a toggle bit at the end of data in the output buffer each time said toggle bit set in said data block is encountered.

5. The graphic processor according to claim 4, wherein said arbitration circuit surrenders an access right of the second bus to another said geometric operation unit each time a toggle bit in data in the output buffer is encountered.

6. The graphic processor according to claim 5, comprising two said geometric operation units.

7. The graphic processor according to claim 6, wherein said arbitration circuit for said two geometric operation units comprises a state machine which transmits and receives a signal indicating each state and a signal indicating the state of said output buffer and arbitrates data output from each geometric operation unit onto said second bus.

8. The graphic processor according to claim 1, wherein said plurality of data blocks each have a toggle bit indicating the end of valid information in the data block.

9. The graphic processor according to claim 8, wherein said plurality of geometric operation units each output a result of operation to the output buffer each time said toggle bit set in said data block is encountered and set a toggle bit indicating the end of data at the end of the data in the output buffer.

10. The graphic processor according to claim 9, wherein said arbitration circuit surrenders an access right of said second bus to another said geometric operation unit each time a toggle bit in data in the output buffer is encountered.

11. A data processing method in a graphic processor, comprising the steps of:

dividing data to be operated upon into a plurality of data blocks;

allocating said plurality of data blocks to a plurality of geometric operation units via a first bus;

processing said allocated data blocks by said plurality of geometric operation units; and performing communication between said plurality of geometric operation units for arbitrating the order of output between them so that data resulting from processing is output onto a second bus in an order corresponding to the sequence of said plurality of data blocks in said data to be operated upon.

12. The data processing method according to claim 11, wherein said graphic processor further comprises a main memory device connected to said first bus, and said allocation step comprises the step of transferring a data block provided through said first bus from said main memory device to said plurality of geometric operation units by direct memory access based on a destination address included in said data block, in said plurality of geometric operation units having an input connected to said first bus.

13. The data processing method according to claim 12, wherein said plurality of data blocks each have a toggle bit indicating the end of valid information in the data block.

14. The data processing method according to claim 13, further comprising the step of outputting a result of operation to an output buffer each time said toggle bit set in said data block is encountered and setting a toggle bit indicating the end of data at the end of the data in the output buffer, in each of said plurality of geometric operation units.

15. The data processing method according to claim 14, wherein said arbitrating step comprises the step of surrendering the access right of said second bus to another said geometric operation unit each time a toggle bit in data in the output buffer is encountered.

16. The data processing method according to claim 14, wherein said arbitrating step comprises the step of transmitting and receiving a signal indicating each state and a signal indicating the state of said output buffer and arbitrating data output from each geometric operation unit onto said second bus.

17. The data processing method according to claim 11, wherein said plurality of data blocks each have a toggle bit indicating the end of valid information in the data block.

18. The data processing method according to claim 17, further comprising the step of outputting a result of operation to the output buffer each time said toggle bit set in said data block is encountered and setting a toggle bit indicating the end of data at the end of the data in the output buffer, in each of said plurality of geometric operation units.

19. The data processing method according to claim 18, wherein said arbitrating step comprises the step of surrendering the access right of said second bus to another said geometric operation unit each time a toggle bit in data in the output buffer is encountered.

20. The data processing method according to claim 19, wherein said arbitrating step comprises the step of transmitting and receiving a signal indicating each state and a signal indicating the state of said output buffer and arbitrating data output from each geometric operation unit onto said second bus.

21. A geometry engine comprising:

a geometry operation unit for performing geometric operations;

an allocation circuit receiving a plurality of data blocks through a first bus sequentially, for allocating the plurality of data blocks to said geometry operation unit and another operation device, said geometry operation unit processing a data block allocated by said allocation circuit to output a result of processing corresponding to the allocated data block;

an output buffer for storing the result of processing, and an arbitration circuit for arbitrating the order of output to a second bus with said another operation device and for outputting the result of processing stored in said output buffer to the second bus in an order corresponding to the sequence of the plurality of data blocks.

22. The geometry engine according to claim 21, wherein said allocation circuit comprises a memory access controller receiving the plurality of data blocks from a memory through the first bus, for transferring the plurality of data blocks to said geometry operation unit and the another operation device based on a destination address included in the plurality of data blocks.

23. The geometry engine according to claim 21, wherein the plurality of data blocks each having a toggle bit indicating the end of valid information in the data block.

24. The geometry engine according to claim 21, wherein said geometry operation unit sets a toggle bit in said output buffer, and said arbitration circuit arbitrates the order of output with the another operation device in accordance with the toggle bit stored in said output buffer.

25. The geometry engine according to claim 24, wherein the plurality of data blocks each have a toggle bit, and said geometry operation unit sets the toggle bit in said output buffer when the toggle bit set in the allocated data block is encountered.

26. The geometry engine according to claim 24, wherein said arbitration circuit outputs a first signal to the another operation device in accordance with the toggle bit stored in said output buffer, the first signal indicating that an access right of the second bus is granted for the another operation device.

27. The geometry engine according to claim 26, wherein said arbitration circuit prevents the first signal from being outputted in accordance with a second signal received from the another operation device.

28. The geometry engine according to claim 24, further comprising a holding circuit for holding data for setting a slave mode, and wherein said arbitration circuit outputs a third signal indicating a request of an access right of the second bus when receiving the data from said holding circuit, and prevents the third signal from being outputted in accordance with the toggle bit stored in said output buffer.

* * * * *